(12) United States Patent
Hamburg

(10) Patent No.: US 7,567,260 B2
(45) Date of Patent: *Jul. 28, 2009

(54) GROUPING LAYERS IN COMPOSITED IMAGE MANIPULATION

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 11/500,796

(22) Filed: Aug. 8, 2006

(65) Prior Publication Data

US 2007/0052728 A1    Mar. 8, 2007

Related U.S. Application Data

(63) Continuation of application No. 09/561,178, filed on Apr. 27, 2000, now Pat. No. 7,088,375.

(51) Int. Cl.
*G09G 5/00* (2006.01)
*H04N 9/74* (2006.01)
*G06K 9/36* (2006.01)

(52) U.S. Cl. ............... 345/629; 345/626; 345/630; 345/674; 348/584; 348/586; 382/276; 382/282; 382/294

(58) Field of Classification Search ......... 345/629–632, 345/634–635, 626, 641; 348/584, 586; 382/276, 382/282–285, 294

See application file for complete search history.

(56) References Cited

U.S. PATENT DOCUMENTS

| | | | |
|---|---|---|---|
| 4,924,299 A | 5/1990 | Mizuno et al. |
| 5,315,390 A | 5/1994 | Windrem |
| 5,487,145 A | 1/1996 | Marsh et al. |
| 5,638,499 A | 6/1997 | O'Connor et al. |
| 5,706,417 A | 1/1998 | Adelson |

(Continued)

FOREIGN PATENT DOCUMENTS

| | | |
|---|---|---|
| EP | 0 564 247 A1 | 10/1993 |
| EP | 0 828 232 A2 | 3/1998 |
| EP | 0 924 652 A2 | 6/1999 |

OTHER PUBLICATIONS

Adobe, Adobe After Effects User guide, pp. 137-191, 323-342, Oct. 1995.

*Primary Examiner*—Xiao M Wu
*Assistant Examiner*—Tize Ma
(74) *Attorney, Agent, or Firm*—Fish & Richardson P.C.

(57) ABSTRACT

A method of compositing a plurality of ordered image layers which include a group of consecutive layers. The group has a shape effect and a composition effect. Any image layers under the group are composited to generate a first intermediate image. A first subset of the plurality of image layers is composited to generate a second intermediate image, the first intermediate image is composited with the second intermediate image according to the composition effect to generate a third intermediate image, and the third intermediate image is composited with a second subset of the plurality of image layer to generate a fourth intermediate image. The first intermediate image is cross-faded with the fourth intermediate image according to the shape effect to generate a fifth intermediate image. The fifth intermediate image is composited with any remaining image layers to generate a final image.

29 Claims, 10 Drawing Sheets

U.S. PATENT DOCUMENTS

| | | |
|---|---|---|
| 5,874,967 A | 2/1999 | West et al. |
| 5,892,521 A | 4/1999 | Blossom et al. |
| 5,937,104 A | 8/1999 | Henderson et al. |
| 5,974,198 A | 10/1999 | Hamburg et al. |
| 6,016,150 A | 1/2000 | Lengyel et al. |
| 6,028,583 A | 2/2000 | Hamburg |
| 6,084,597 A | 7/2000 | Herbstman et al. |
| 6,115,049 A | 9/2000 | Winner et al. |
| 6,130,676 A | 10/2000 | Wise et al. |
| 6,166,716 A | 12/2000 | Kashino |
| 6,184,891 B1 | 2/2001 | Blinn |
| 6,185,342 B1 | 2/2001 | Hamburg et al. |
| 6,215,503 B1 | 4/2001 | Snyder et al. |
| 6,239,807 B1 | 5/2001 | Bossut |
| 6,269,196 B1 | 7/2001 | Hamburg |
| 6,301,382 B1 | 10/2001 | Smith et al. |
| 6,369,830 B1 | 4/2002 | Brunner et al. |
| 6,466,210 B1 | 10/2002 | Carlsen et al. |

GROUPING LAYERS IN COMPOSITED IMAGE MANIPULATION

This application is a continuation of U.S. patent application Ser. No. 09/561,178 filed on Apr. 27, 2000 and issued as U.S. Pat. No. 7,088,375 on Aug. 8, 2006.

BACKGROUND

The present invention is generally related to graphical image manipulation systems, and more particularly to a system and apparatus for compositing multiple graphical images.

A graphical image manipulation computer program, such as Adobe Photoshop 4.0, from Adobe Systems Incorporated, of San Jose, Calif., may store a graphical image as a set of image layers. Such a program builds a final image by compositing the image layers together. The image layers may be thought of as stacked sheets of acetate. The density of the ink on the acetate controls the transparency of the sheet, i.e., the extent to which the sheet obscures the underlying sheets. In the computer program, the color and density of the ink on the acetate sheet are represented by a color value and an opacity (or "alpha") value, respectively.

Referring to FIG. 1, a conventional graphical image document 10 includes a set of image layers 12, denoted as layers 1, 2, . . . , n, organized in a layer stack. The bottom layer, i.e., layer 1, acts as the background or bottom sheet, whereas the other layers, i.e., layers 2, 3, . . . , n, act as the transparencies which are overlaid on the background.

Referring to FIG. 2, each image layer 12 typically includes an image 14, an optional mask or masks 16, and compositing controls 18. Typically, the image 14 is represented by an array of pixels, with each pixel having a color and, optionally, an opacity. Similarly, the mask 16 is typically represented by an array of pixels, with each pixel having an opacity. However, the image 14 and the mask 16 could be defined analytically, e.g., by using shape outlines, or by other functions which define color and/or opacity as a function of position. In addition, the image 14 and the mask 16 can be dynamic, i.e., computed at the time the layers are composited from the results of compositing the underlying layers or other data. For example, one layer in the document could be a filter or an adjustment layer in which the data representing the image is determined from the data in an underlying image layer or determined from the composition of the underlying image layers.

The compositing controls 18 may include a global opacity 18a and a transfer mode 18b. The global opacity 18a controls, in essence, the transparency of the entire image layer 12, whereas the transfer mode determines how the colors in the image layer 12 mix with the colors accumulated from the underlying layers. The compositing controls may also be considered to include dynamic masks.

The process of stacking the acetate sheets to form the final image is modeled by an accumulation buffer which stores a composited color for each pixel. The image layers are composited in order from bottom to top. Referring to FIG. 3, a conventional process 20 for compositing an image layer begins by calculating any dynamic data in the image layer, such as the color of the pixels in the image or the opacity of the pixels in the mask (step 22). Then the opacity of each pixel is determined from the mask 16, the global opacity 18a, and, if appropriate, the image 14 (step 24). Finally, the color of each pixel in the image layer is combined with the composited color of the corresponding pixel in the accumulation buffer to generate a new composited color (step 26). The combination is controlled by the opacity of the layer pixel and the transfer mode 18b. This process is iterated for each layer until all the layers have been composited, thus generating the final image.

There are a variety of situations in which a user may wish to group individual layers together and work with the group as a single entity. For example, the user may wish to apply an effect to a group of layers to generate the visual appearance that the group is actually a single layer. Adobe Photoshop 3.0 introduced one such grouping mechanism, called a "clipping group". In a conventional clipping group, all of the layers in the clipping group are influenced by the mask and transfer mode of the base layer in the group. Unfortunately, in some instances, the image generated by a graphical document that includes a clipping group includes image defects or does not correspond to the desired image. Specifically, some transfer mode effects, such as highlighting and shadowing, may be lost or altered unacceptably in some portions of the image.

SUMMARY

In one aspect, the invention is directed to a method of compositing a set of ordered image layers in a document. In the method, a group containing a plurality of image layers from the set of image layers is defined, and at least one mask from at least one of the plurality of image layers is removed to generate a modified group containing one or more modified image layers. A first intermediate image from at least an initial state of the document below the group is determined, the first intermediate image is composited with at least some of the plurality of image layers in the modified group to generate a second intermediate image, and the initial state of the document below the group is cross-faded with the second intermediate image according to the at least one mask to generate a third image.

Implementations of the invention may include one or more of the following features. The first intermediate image may be a copy of the initial state of the document below the group. The compositing step may composite the first intermediate image with all of the plurality of image layers of the modified group. Determining the first intermediate image may includes compositing a first subset of the plurality of image layers in the modified group to generate a fourth intermediate image, and compositing the fourth intermediate image with the initial state of the document below the group may generate the first intermediate image. At least one composition effect may be removed from one or more layers of the plurality of layers, and the fourth intermediate image may be composited with the initial state according to the at least one composition effect. Compositing the first intermediate image with at least some of the plurality of image layers may include compositing the first intermediate image with a second, non-overlapping subset of the plurality of image layers. The first subset may consist of consecutive layers at the bottom of the group, and the second subset may consist of consecutive layers at the top of the group. The group may consist of the first subset and the second subset. Any image layers under the group may be composited to generate the initial state. The initial state may be determined from a default color and a default transparency. The third image may be composited with any remaining image layers to generate a fifth image. A mask may be removed from a bottom layer of the group.

In another aspect, the invention is directed to a method of compositing a set of ordered image layers in a document. A group containing a plurality of image layers from the set of image layers is defined, and at least one mask from at least one of the plurality of image layers is removed to generate a modified group containing one or more modified image layers. A first subset of image layers in the modified group is composited to generate a first intermediate image, and an initial state of the document below the group is composited with the first intermediate image according to a composition effect to generate a second intermediate image. The second intermediate image is composited with a second subset of the plurality of image layers in the modified group to generate a third intermediate image, and the initial state of the document below the group is cross-faded with the second intermediate image according to the at least one mask to generate a third image.

Implementations of the invention may include one or more of the following features. The composition effect may be removed from at least one of the plurality of image layers.

In another aspect, the invention is directed to a method of compositing a set of ordered image layers in a document. In the method, a group containing a plurality of image layers from the set of image layers is defined, and at least one mask from at least one of the plurality of image layers is removed to generate a modified group containing one or more modified image layers. An initial state of the document is composited with the image layers from the modified group to generate a first intermediate image, and the initial state is cross-faded with the first intermediate image according to the at least one mask to generate a second image.

Implementations of the invention may include one or more of the following features. The removing step may include removing masks from two or more of the plurality of image layers. Removing the one or more masks may leave one or more unmodified image layers in the modified group.

In another aspect, the invention is directed to a method of compositing a set of ordered image layers in a document. In the method, a group containing a plurality of image layers from the set of image layers is defined. The group has a shape effect and a first composition effect. A first subset of the plurality of image layers is composited to generate a first intermediate image, and an initial state of the document below the group is composited with the first intermediate image according to the first composition effect to generate a second intermediate image. The composition effect is not a normal transfer mode. The second intermediate image is composited with a second subset of the plurality of image layers to generate a third intermediate image, and the initial state is cross-faded with the third intermediate image according to the shape effect to generate a fourth image.

Implementations of the invention may include one or more of the following features. The first composition effect may discard a luminance of the first intermediate image and use a luminance of the initial state. The first composition effect may be a transfer mode selected from Hue, Saturation and Color. A layer in the second subset may include a second composition effect that modifies a luminance. The second composition effect may be a transfer mode selected from Multiply and Screen. The composition effect and shape effect may be derived from a bottom image layer in the group. The shape effect may include at least one mask. The composition effect may include at least one mask. The group may consist of consecutive layers. Compositing the first subset from the plurality of image layers may include removing composition and shape effects from a base layer at the bottom of the first subset.

In another aspect, the invention is directed to a method of compositing a set of ordered image layers. In the method a group containing a plurality of consecutive image layers from the set of image layers is defined. The group consists of a base layer, a first subset of consecutive image layers, and a second subset of consecutive image layers from the plurality of image layers. Any image layers before the group are composited to generate a first intermediate image. A shape effect and a composition effect from the base layer are removed to generate a modified base layer. The modified base layer is composited with the first subset of image layers to generate a second intermediate image, and the first intermediate image is composited with the second intermediate image according to the composition effect to generate a third intermediate image. The third intermediate image is composited with the second subset of image layers to generate a fourth intermediate image, the first intermediate image is cross-faded with the fourth intermediate image according to the shape effect to generate a fifth intermediate image, and the fifth intermediate image is composited with any remaining image layers after the group to generate a final image.

Possible advantages in implementations of the invention may include one or more of the following. At least some of the color blending of individual layers in the clipping group may not be influenced by the transfer mode of the base layer, while still achieving the shape-preserving effects of clipping groups. The image may correspond more precisely to the desired image. Transfer mode effects, such as highlighting and shadowing, may be generated with fewer image defects.

Other features and advantages will become apparent from the following description, including the drawings and claims.

DETAILED DESCRIPTION

In brief, the invention enables a user of a computer graphics program to create a more versatile clipping group. As discussed above, in a traditional clipping group, all of the layers in the clipping group are influenced by the transfer mode and the masks of the base layer. In the new clipping group, at least one mask from one of the layers in the clipping group affects all the layers of the clipping group. Also, at least one transfer mode or mask from the clipping group can affect some, but not all, of the layers in the clipping group. The masks that affect all the layers of the clipping group may be termed "shape effects", whereas the masks or transfer modes that affect some (but not all) of the layers may be termed "composition effects". The determination of which masks will affect which layers may be made by the user and stored with the base layer. Alternately, an implementation could impose a selection of layers to which masks will apply, e.g., with a default.

Figure 1:
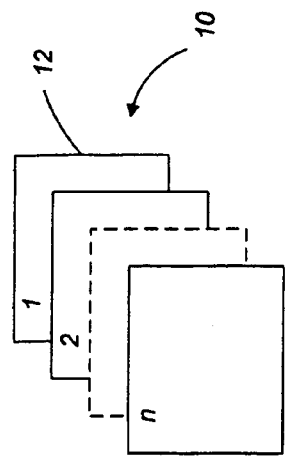
FIG. 1 is a block diagram of a prior art graphical image document containing multiple image layers.
Figure 2:
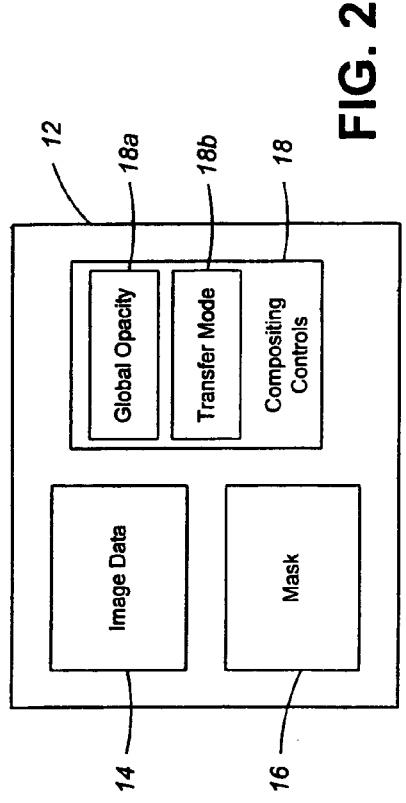
FIG. 2 is a block diagram of an image layer from FIG. 1.
Figure 3:
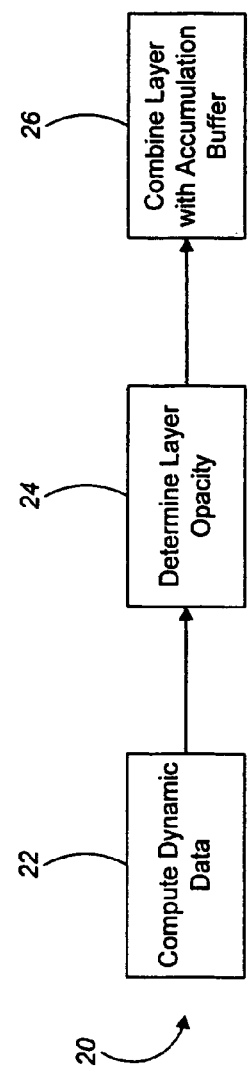
FIG. 3 is a flow chart illustrating a prior art method of compositing a layer.
Figure 4:
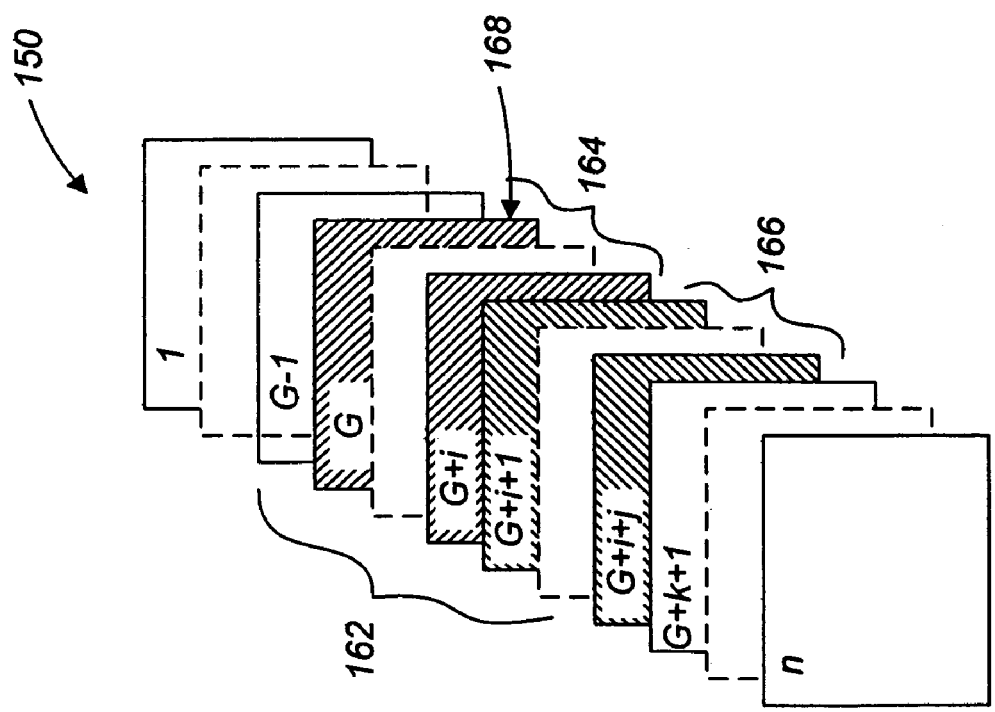
FIG. 4 is a block diagram of a graphical image document containing a clipping group divided into two sections, in accordance with the present invention.
Figure 5A:
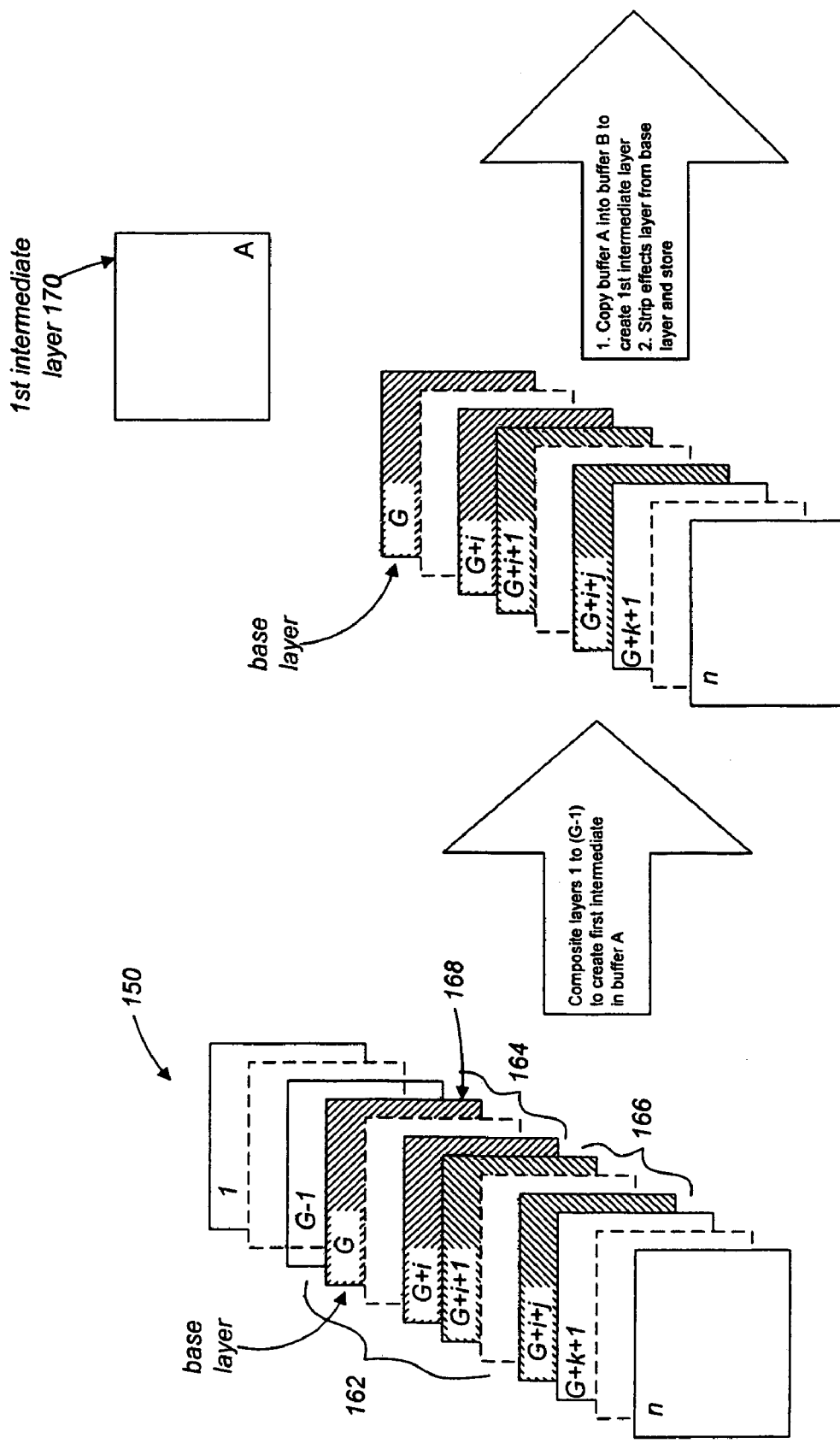
FIGS. 5A through 5D illustrate a method of compositing image layers in a graphical image document containing a clipping group, in accordance with the present invention.
Figure 5B:
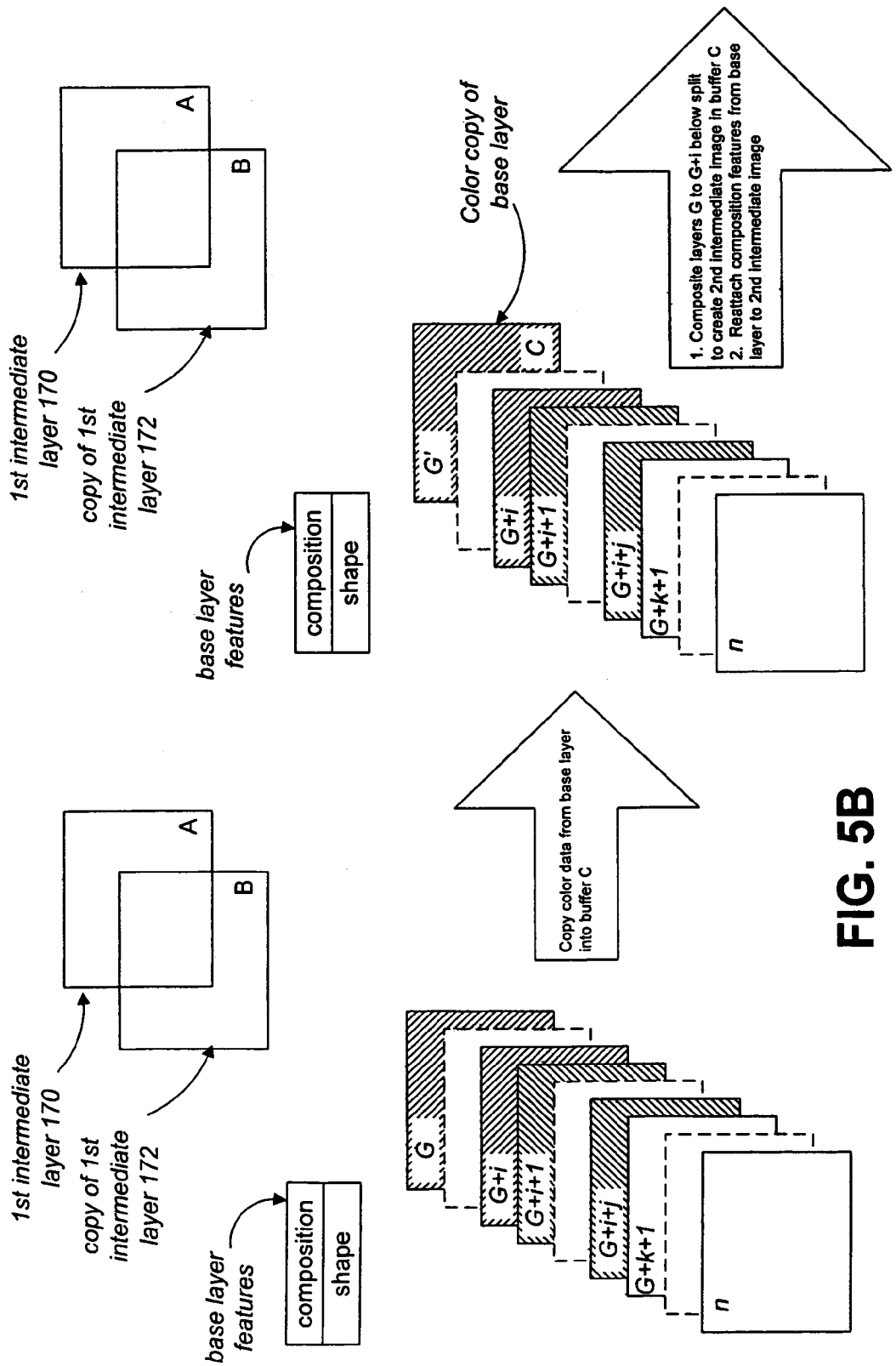
Figure 5C:
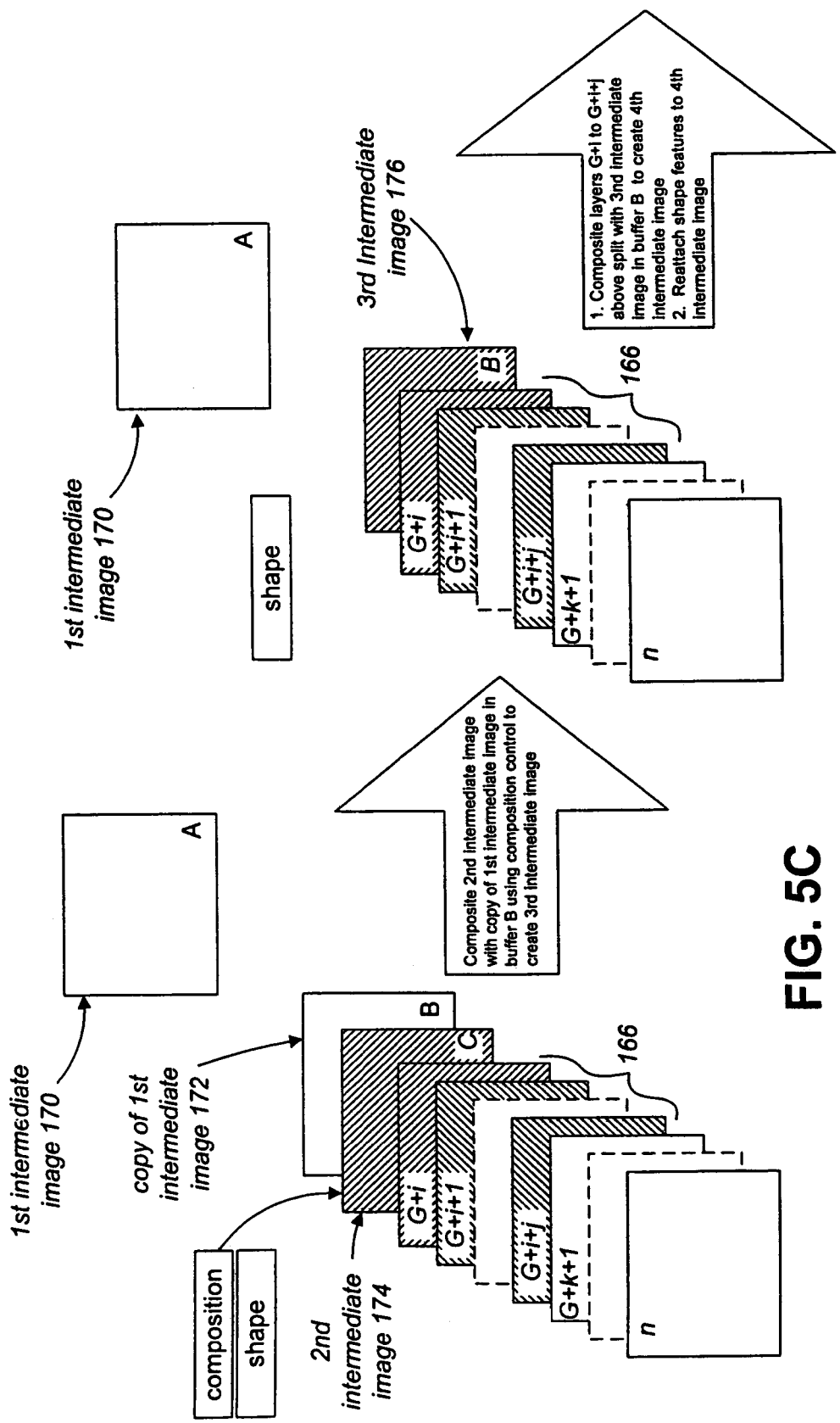
Figure 5D:
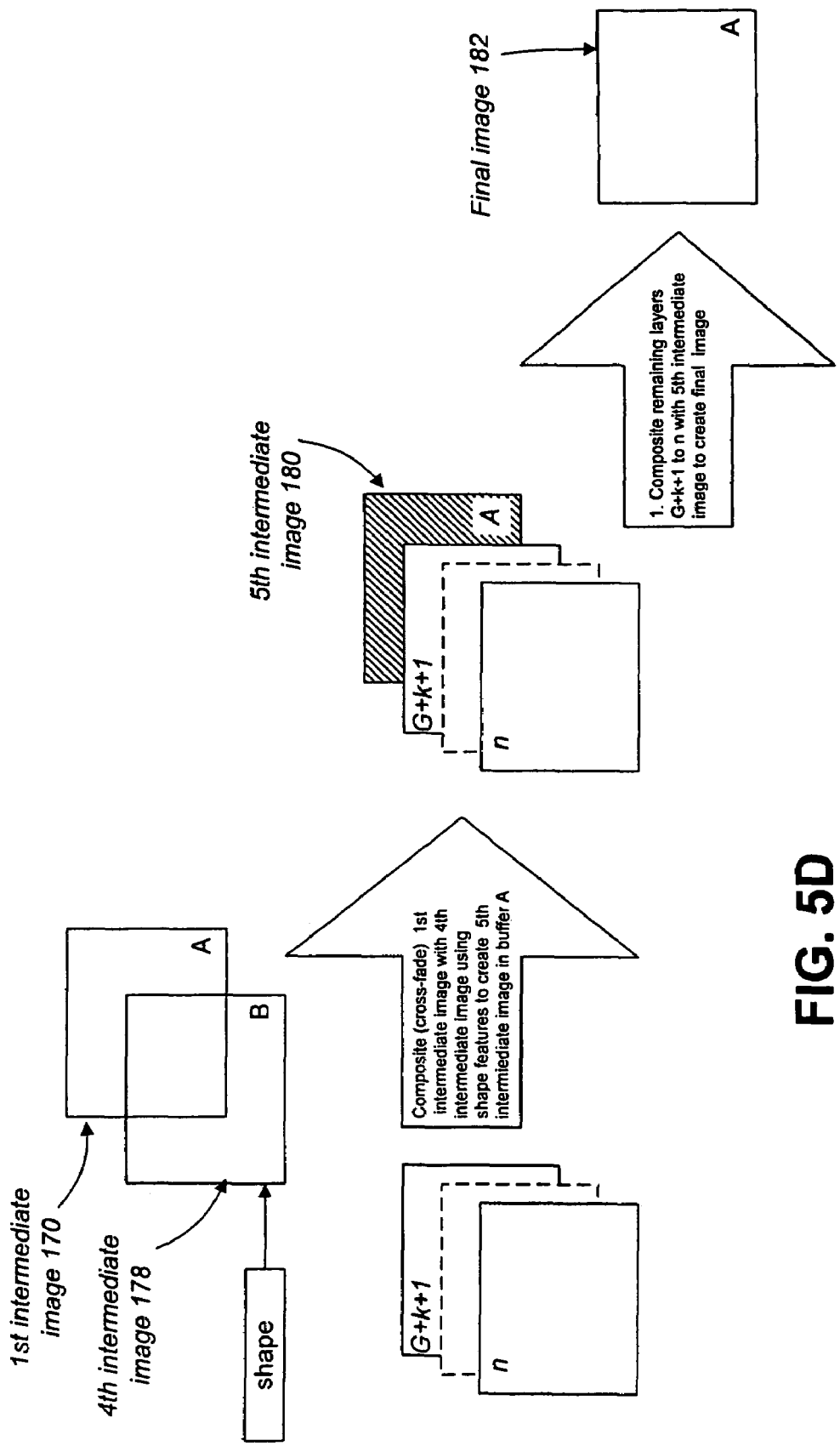

As shown in FIG. 4, graphical image document 150 includes multiple image layers 152, denoted as layers 1, 2, . . . , n, organized in a layer stack. Each image layer can include an image, zero or more masks, and image layer compositing controls, such as a global opacity, a color blending effect, such as a transfer mode, and a transparency treatment. The image provides color information, and optionally opacity information, as a function of position. Similarly, the optional mask or masks provide opacity information as a function of position. The image and the masks may be represented analytically or by pixels, and may include image objects, graphical objects, text objects, and the like. The transparency treatment is to the opacity information as the transfer mode is to the color information, i.e., it determines a new opacity from the opacity of the individual image layer and the opacity of the composited underlying layers.

At least two image layers in the document 150 form a clipping group 162. For example, if the clipping group 162 includes (k+1) image layers, then layers G, G+1, . . . , G+k may be included in the clipping group 162. The clipping group 162 is an image compositing construct which permits the properties of the bottom layer 108 of the clipping group 162, i.e., layer G, to influence the composition of the other layers in the clipping group. A list identifying the image layers, i.e., layers G, G+1, . . . , G+k, that form the clipping group may be stored with the base layer 168. The base layer of the clipping group includes at least one shape-related effect, e.g., a mask, and at least one composition effect, e.g., a transfer mode. The shape-related effects may be represented analytically or by a pixel image.

The clipping group 162 is itself divided into two portions, including a lower portion 164 that is influenced by the transfer mode and all of the masks of the base layer, and an upper portion 166 that is influenced by at least one (but not necessarily all) of the masks from the base layer. For example, if the lower portion 164 includes (i+1) image layers and the upper layer includes (j+1) image layers, then layers G, G+1, . . . , G+i may be included in the lower portion and the layers G+i+1, G+i+2, . . . , G+i+j (i.e., G+k) maybe be included in the upper portion of the clipping group 162. The clipping group 162 also includes a pointer that indicates the split point in the clipping group between the lower and upper portions. For example, the pointer may store the layer number of the last layer G+i of the lower portion or the first layer G+i+1 of the upper portion of the clipping group. If the lower portion of the clipping group is empty, the pointer can be implied.

For each mask in the base layer, the user may select whether the mask applies to the both the upper portion 166 and the lower portion 164 of the clipping group 162, or only to the lower portion 164 of the clipping group 162. However, at least one mask should to both the upper portion 166 and the lower portion 164 of the clipping group 162. In addition, at least one mask or transfer mode should apply only to the lower portion 162 of the clipping group 162. Thus, the shape effects apply to both the upper and lower portions of the clipping group, whereas the composition effects only apply to the lower portion of the clipping group.

FIGS. 5A through 5D schematically illustrate a method of compositing a document 150 containing a clipping group 162. In this method the clipping group effects are derived from the base layer of the group. The method utilizes three accumulation buffers, which will be labeled buffers A, B and C. The accumulation buffers can include both color and opacity information.

Initially, the computer graphics program determines an initial state of the document below the clipping group, and stores the initial state in the first accumulation buffer A. The first accumulation buffer A may include opacity information. For example, the image layers underlying the clipping group, i.e., layers 1, 2, . . . , G-1, can be composited (e.g., blended) normally using the first accumulation buffer A to generate a first intermediate image 170. Compositing can cover a variety of operations, including accumulation or blending, cross-fading, and erasing. If there are no image layers beneath the clipping group, the first accumulation buffer can be set to the initial state of an image used by the graphics program using a default color (e.g., white or black) and default transparency (e.g., transparent or opaque).

Once the initial state of the document below the clipping group has been determined, the contents of the first accumulation buffer A are copied into the second accumulation buffer B to create a copy 172 of the first intermediate image. In addition, the shape and composition effects are stripped from the base layer G of the clipping group 162 and stored. The color components (but not the transparency components) of the base layer G can be copied into the third accumulation buffer C to create a color copy of the base layer.

Then the layers in the clipping group 62 below the split point, i.e., layers G+1, . . . , G+i, are composited (e.g., blended) with the color components of base layer 178 (G') in accumulation buffer C to generate a second intermediate image 174.

For conventional accumulative blending, all the alpha values of the accumulation buffer C are set to 1 before performing the accumulation. Applying the alpha values from the base layer G after the accumulation has been performed (as discussed below) generates the appropriate clipping effect.

To composite clipping layers that erase areas or otherwise need to change opacity as part of their effect, a more complex operation needs to be performed. In this operation, the accumulation buffer C is initialized with color values and any non-shape related alpha values. Special "clipped" approaches to potential compositing operations can be identified, and the lower portion of the clipping group can composited using one of these special "clipped" approaches. However, it is probably sufficient to initialize the alpha values of buffer C to 1 and then apply any composition effect masks when compositing the third accumulation buffer C into second accumulation buffer B.

The composition effects, such as the transfer mode, from the base layer G are attached to the second intermediate image 174. In addition, some (but not all) of the masks from the base layer may be attached to the second intermediate image 174. Specifically, any masks (and opacity values that are part of the base layer itself) may be selected by the user to affect only the lower portion (and not the upper portion) of layers in the clipping group may be attached.

The copy of the first intermediate image 174 is composited (e.g., blended) with the second intermediate image 172 in the second accumulation buffer B to generate a third intermediate image 176. Since the composition effects from the base layer are attached to the second intermediate image, this blending uses the transfer mode of the base layer. In addition, the blending uses any masks selected by the user to apply to the lower portion 164 of the clipping group.

Once the third intermediate image 176 has been created, each of the layers of the clipping group above the split point, i.e., layers G+i+1, G+i+2, . . . , G+k, is composited (e.g., blended) with the third intermediate image in the second accumulation buffer B to generate a fourth intermediate image 178.

The first intermediate image 170 in the first accumulation buffer A is composited with the fourth intermediate image 178 using the shape effects from the base layer G to generate a fifth intermediate image 180. This composition can be a cross-fade, which (as discussed in U.S. patent application Ser. No. 09/306,374, filed May 6, 1999, the entire disclosure of which is incorporated herein by reference) calculates a resulting graphic element <R,r> having color value R and alpha value r in accordance with <R,r>=XFade (<X,x>, <Y,y>, z)
r=InterpolateAlpha (x, y, z),
R=InterpolateColor (X, Y, t), and
t=y·z/r, where InterpolateAlpha can be a linear interpolation function yielding r=x·(1−z)+y·z, and InterpolateColor can be a linear interpolation function yielding R=X·(1−t)+Y·t.

As previously noted, these shape effects include the masks (and opacity values that can be part of the base layer itself) selected by the user to apply to both the lower and upper portions of the clipping group. This might be just one of the masks from the base layer, or it might include all the masks from the base layer. In addition, the shape effects may include other opacity-affecting features, such as a global opacity.

Finally, if there were image layers in the document above the clipping group, the fifth intermediate image 76 is composited (e.g., blended) with the remaining image layers, i.e., G+k+1, G+k+2, . . . , n, in the first accumulation buffer A to generate a final image 182. If there are no image layers above the clipping group, the fifth intermediate image 76 becomes the final image.

Of particular interest is the situation where the base layer includes a first composition effect that could negate a second composition effect in one of the layers in the clipping group. This situation tends to arise if the first composition effect discards a color characteristic, e.g., luminance, from the first intermediate image and uses only the color characteristics of the initial state. In a conventional clipping group, highlighting or shadowing effects in layers of the group will not be properly preserved if the base layer has certain transfer modes. In contrast, by placing the second composition effect in one of the layers in the second subset, the first composition effect will not negate the second composition effect, and the document can be generated with the desired appearance. For example, the second composition effect can be a transfer mode that generates highlighting or shadowing, such as Screen or Multiply, respectively, and the first composition effect can be a transfer mode that discards the luminance from the second intermediate image, such as Hue, Saturation or Color.

In another implementation, the computer graphics program can remove a mask from an arbitrary layer in the clipping group when performing the composition. In this implementation, the first subset can be empty (i.e., not contain any layers).

Figure 6A:
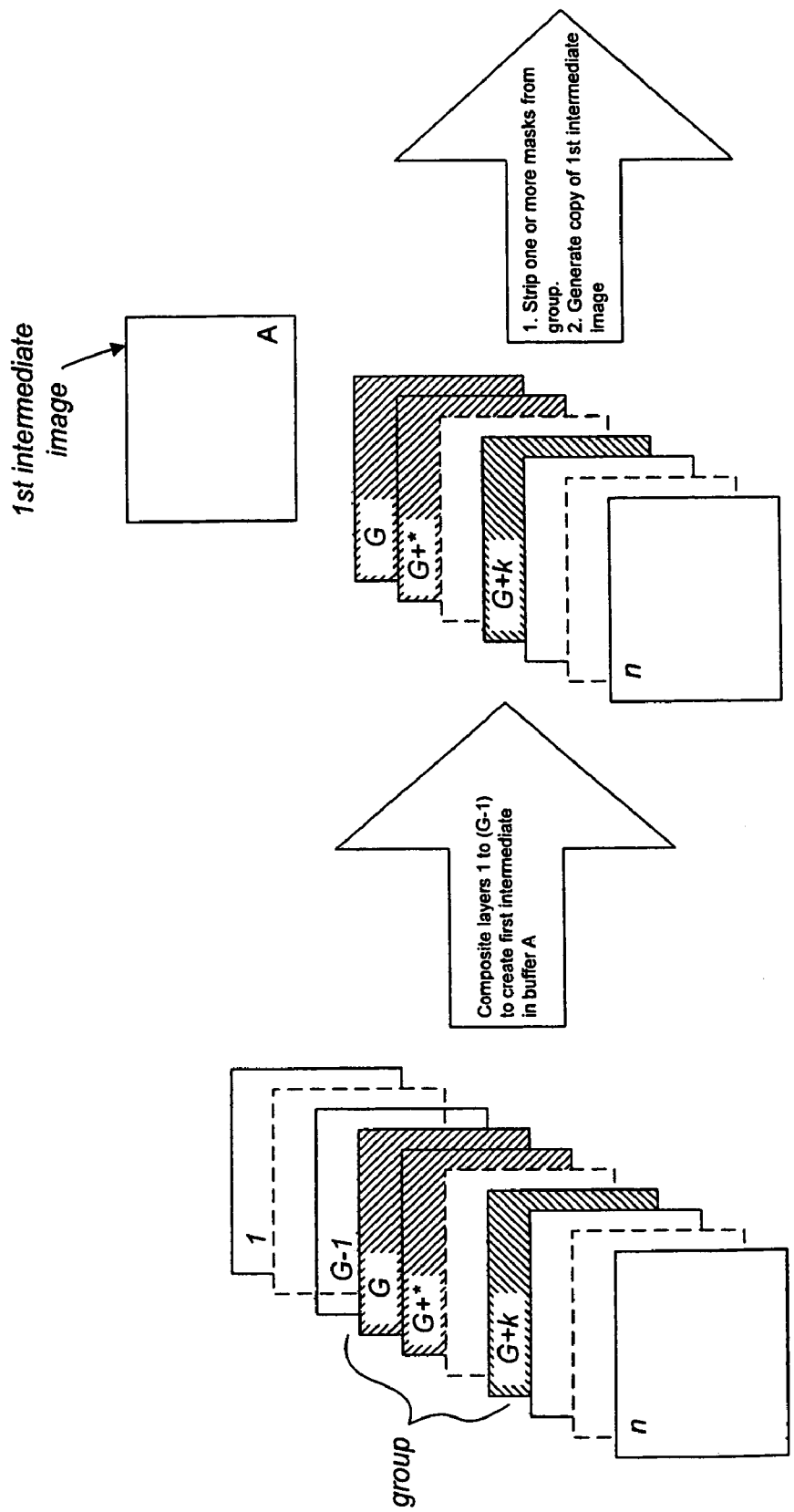
FIGS. 6A through 6C illustrate another implementation of a method of compositing image layers in a graphical image document containing a clipping group.
Figure 6B:
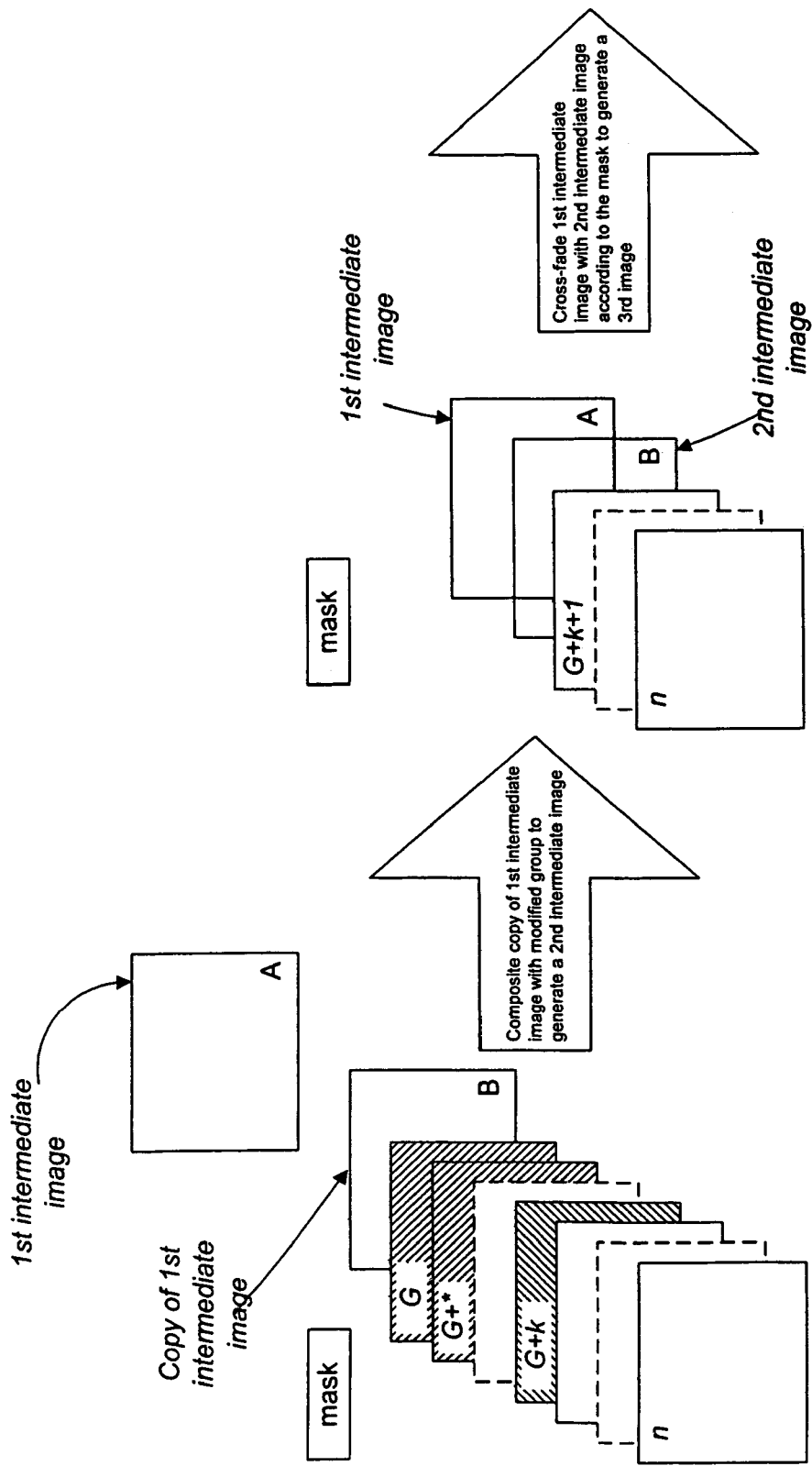
Figure 6C:
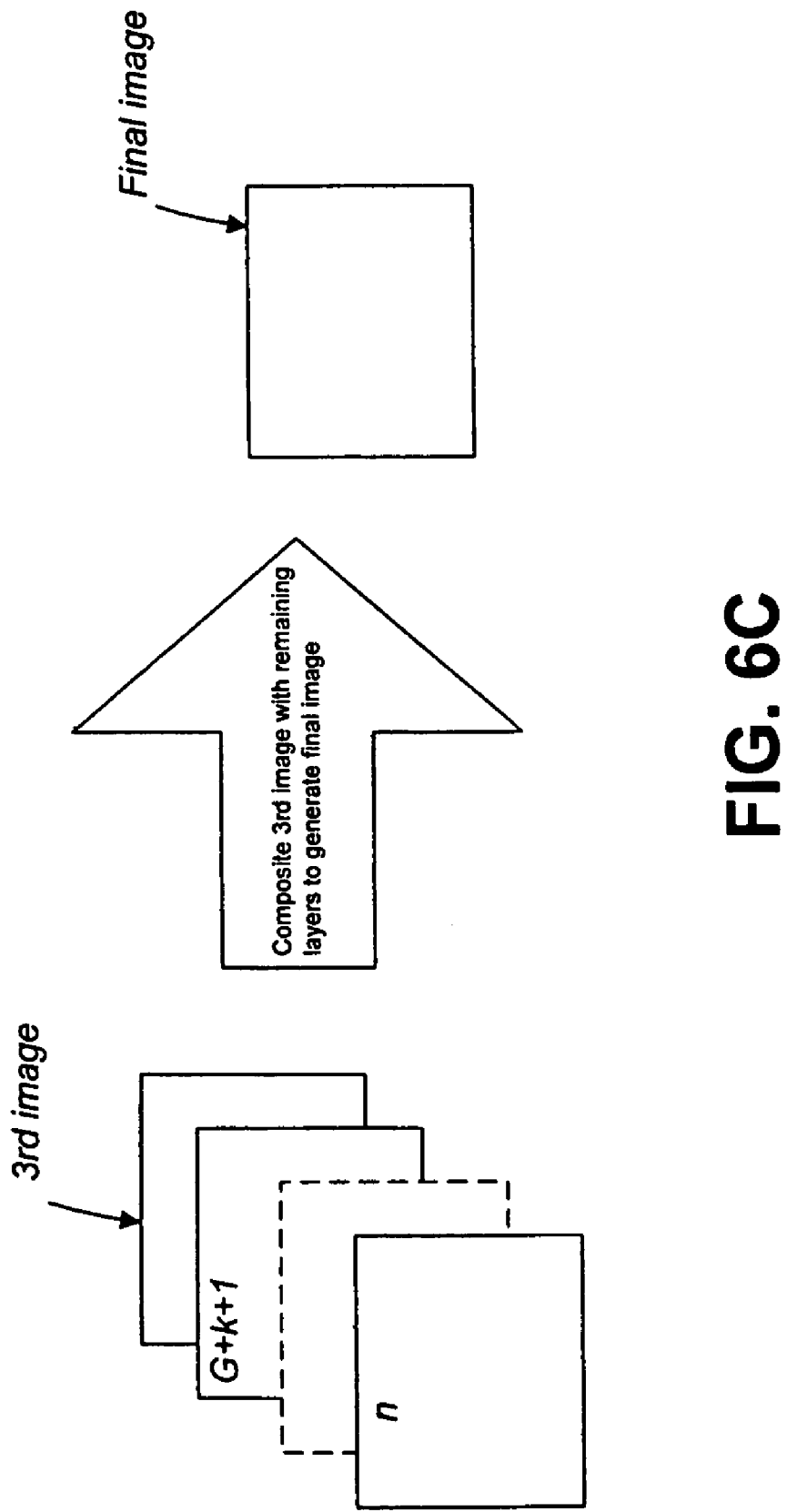

As shown in FIGS. 6A through 6C, the program initially determines the initial state of the document below the clipping group, e.g., by compositing any layers below the clipping group to form a first intermediate image. One or more layers in the clipping group are modified by removing one or more masks from layer. The first intermediate image is composited with the layers in the clipping group, including the modified layers, to form a second intermediate image. Then the first intermediate image is cross-faded with the second intermediate image according the previously removed mask or masks to generate a third intermediate image. Finally, the third intermediate image is composited with any remaining layers after the clipping group to generate a final image.

Figure 7:
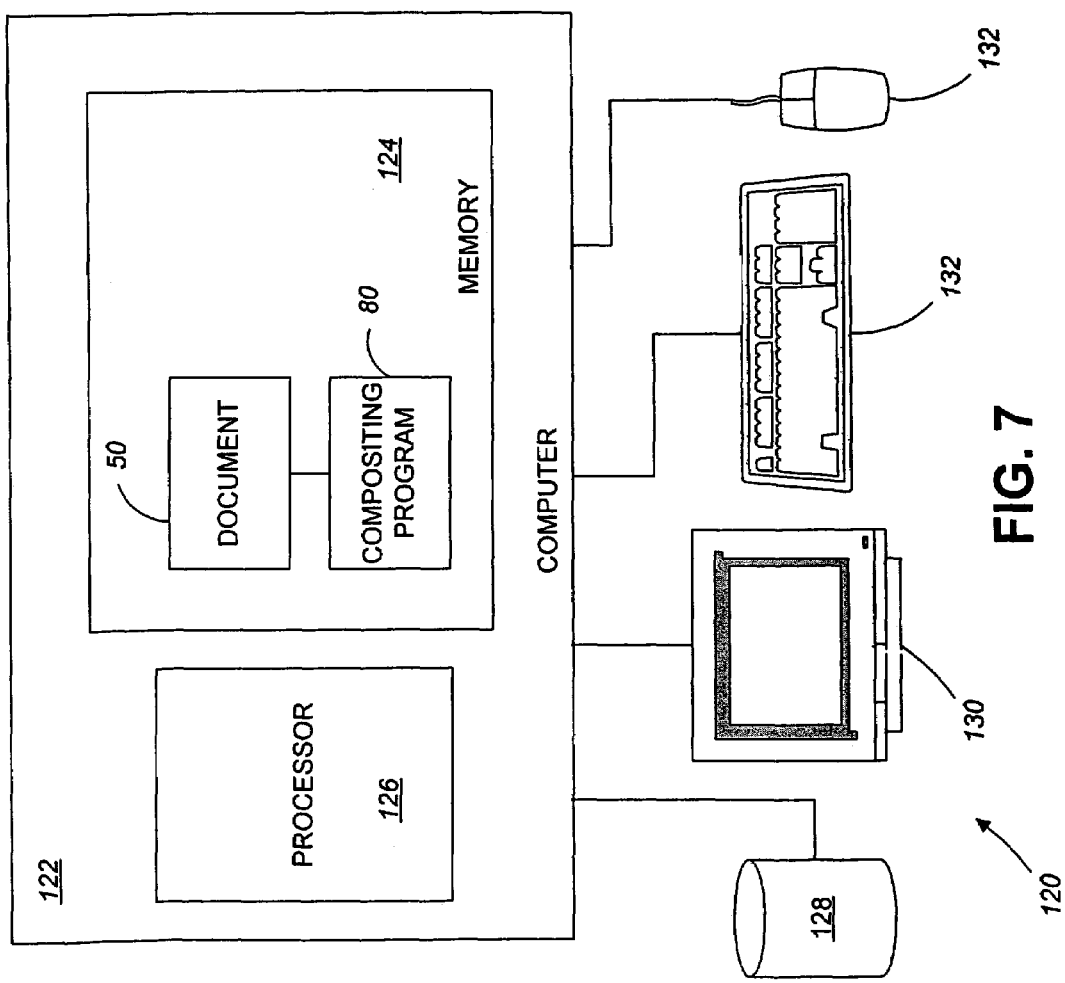
FIG. 7 is a block diagram of a computer system that may be used to implement the invention.

Referring to FIG. 7, the method of the present invention may be implemented with a memory 124, such as conventional random access memory, and a processor 126, such as a conventional microprocessor. The memory and processor may be components of a general-purpose computer 122 of conventional construction in a computer system 120. The computer system 120 may also include a mass storage device 128, an output device 130, such as a display screen, laser printer print engine, photo typesetter, or laser film recorder, and an input-device 132, such as a keyboard or mouse. The microprocessor 126 is controlled by a graphical image manipulation program 80 stored in memory 124. The graphical image manipulation program 80 has access to the document 50. Alternately, the processor and memory may be embedded in a peripheral device.

The methods described may be implemented in hardware, firmware, software, or combinations thereof, or in a computer program product tangibly embodied in a computer readable storage device. Storage devices suitable for tangibly embodying the computer program include all forms of non-volatile memory, including semiconductor memory devices, magnetic disks, magneto-optical disks, and optical disks.

A number of embodiments of the invention have been described. Nevertheless, it will be understood that various modifications may be made without departing from the spirit and scope of the invention. Accordingly, other embodiments are within the scope of the following claims.

What is claimed is:

1. A system, configured to execute a method for compositing a set of image layers in a document, comprising a processor configured to:
    define a group containing a plurality of image layers from the set of image layers as a clipping group;
    remove at least one mask from at least one of the plurality of image layers in the group to generate a modified group of image layers containing one or more modified image layers;
    determine a first intermediate image from at least an initial state of the document below the modified group;
    composite the first intermediate image with at least some of the plurality of image layers in the modified group to generate a second intermediate image; and
    cross-fade the initial state of the document below the modified group with the second intermediate image according to the at least one mask to generate a third image.

2. The system of claim 1, wherein the first intermediate image is a copy of the initial state of the document below the modified group.

3. The system of claim 2, wherein the processor configured to composite the first intermediate image with at least some of the plurality of image layers in the modified group is further configured to composite the first intermediate image with all of the plurality of image layers of the modified group.

4. The system of claim 1, wherein the processor configured to determine the first intermediate image is further configured to composite a first subset of the plurality of image layers in the modified group to generate a fourth intermediate image, and to composite the fourth intermediate image with the initial state of the document below the modified group to generate the first intermediate image.

5. The system of claim 4, wherein the processor is further configured to remove at least one composition effect from one or more layers of the plurality of layers, and to composite the fourth intermediate image with the initial state according to the at least one composition effect.

6. The system of claim 4, wherein the processor configured to composite the first intermediate image with at least some of the plurality of image layers is further configured to composite the first intermediate image with a second, non-overlapping subset of the plurality of image layers.

7. The system of claim 6, wherein the first subset of the plurality of image layers in the modified group consists of consecutive layers at the bottom of the modified group.

8. The system of claim 7, wherein the second subset of the plurality of image layers in the modified group consists of consecutive layers at the top of the modified group.

9. The system of claim 8, wherein the modified group consists of the first subset and the second subset.

10. The system of claim 1, wherein the processor is further configured to composite any image layers under the modified group to generate the initial state.

11. The system of claim 1, wherein the processor is further configured to determine the initial state from a default color and a default transparency.

12. The system of claim 1, wherein the processor is further configured to composite the third image with any remaining image layers to generate a fifth image.

13. The system of claim 1, wherein the processor is further configured to remove a mask from a bottom layer of the group.

14. A system, configured to execute a method for compositing a set of image layers in a document, comprising a processor configured to:
define a group containing a plurality of image layers from the set of image layers as a clipping group;
remove at least one mask from at least one of the plurality of image layers in the group to generate a modified group of image layers containing one or more modified image layers;
composite a first subset of image layers in the modified group to generate a first intermediate image;
composite an initial state of the document below the modified group with the first intermediate image according to a composition effect to generate a second intermediate image;
composite the second intermediate image with a second subset of the plurality of image layers in the modified group to generate a third intermediate image; and
cross-fade the initial state of the document below the modified group with the third intermediate image according to the at least one mask to generate a third image.

15. The system of claim 14, wherein the processor is further configured to remove the composition effect from at least one of the plurality of image layers.

16. A system, configured to execute a method for compositing a set of image layers in a document, comprising a processor configured to:
define a group containing a plurality of image layers from the set of image layers as a clipping group;
remove at least one mask from at least one of the plurality of image layers in the group to generate a modified group of image layers containing one or more modified image layers;
composite an initial state of the document below the modified group with the image layers from the modified group to generate a first intermediate image; and
cross-fade the initial state of the document below the modified group with the first intermediate image according to the at least one mask to generate a second image.

17. The system of claim 16, wherein the processor configured to remove at least one mask from at least one of the plurality of image layers in the group is further configured to remove masks from two or more of the plurality of image layers.

18. The system of claim 16, wherein the processor configured to remove at least one mask from at least one of the plurality of image layers in the group is further configured to leave one or more unmodified image layers in the modified group.

19. A system, configured to execute a method for compositing a set of image layers in a document, comprising a processor configured to:
define a group containing a plurality of image layers from the set of image layers as a clipping group, the group having a shape effect and a first composition effect;
composite a first subset of the plurality of image layers to generate a first intermediate image;
composite an initial state of the document below the group with the first intermediate image according to the first composition effect to generate a second intermediate image, wherein the composition effect is not a normal transfer mode;
composite the second intermediate image with a second subset of the plurality of image layers to generate a third intermediate image; and
cross-fade the initial state of the document below the group with the third intermediate image according to the shape effect to generate a fourth image.

20. The system of claim 19, wherein the first composition effect is an effect that discards a luminance of the first intermediate image and uses a luminance of the initial state.

21. The system of claim 19, wherein the first composition effect is a transfer mode selected from Hue, Saturation and Color.

22. The system of claim 21, wherein a layer in the second subset includes a second composition effect that modifies a luminance.

23. The system of claim 22, wherein the second composition effect is a transfer mode selected from Multiply and Screen.

24. The system of claim 19, wherein the composition effect and shape effect are derived from a bottom image layer in the group.

25. The system of claim 19, wherein the shape effect includes at least one mask.

26. The system of claim 25, wherein the composition effect includes at least one mask.

27. The system of claim 19, wherein the group consists of consecutive layers.

28. The system of claim 19, wherein the processor configured to composite the first subset from the plurality of image layers is configured to remove composition and shape effects from a base layer at the bottom of the first subset.

29. A system, configured to execute a method for compositing a set of image layers in a document, comprising a processor configured to:
define a group containing a plurality of consecutive image layers from the set of image layers as a clipping group, the group consisting of a base layer, a first subset of consecutive image layers and a second subset of consecutive image layers from the plurality of image layers;
composite any image layers before the group to generate a first intermediate image;
remove a shape effect and a composition effect from the base layer to generate a modified base layer;
composite the modified base layer with the first subset of image layers to generate a second intermediate image;
composite the first intermediate image with the second intermediate image according to the composition effect to generate a third intermediate image;
composite the third intermediate image with the second subset of image layers to generate a fourth intermediate image;
cross-fade the first intermediate image with the fourth intermediate image according to the shape effect to generate a fifth intermediate image; and
composite the fifth intermediate image with any remaining image layers after the modified group to generate a final image.

* * * * *